May 13, 1924.

B. WALTER

GAS WASHER

Filed Dec. 27, 1921  2 Sheets-Sheet 2

1,493,579

Witnesses:
Edwin Trub

Inventor:
BRUCE WALTER.
By D. Anthony Usina
Attorney

Patented May 13, 1924.

1,493,579

UNITED STATES PATENT OFFICE.

BRUCE WALTER, OF PITTSBURGH, PENNSYLVANIA.

GAS WASHER.

Application filed December 27, 1921. Serial No. 525,141.

*To all whom it may concern:*

Be it known that I, BRUCE WALTER, a citizen of the United States, and resident of Pittsburgh, in the county of Allegheny and State of Pennsylvania, have invented certain new and useful Improvements in Gas Washers, of which the following is a specification.

This invention relates to the removal from combustible gases of the finely divided solids or impurities carried in suspension therein, by washing or wet cleaning the gases. The invention, although not limited thereto, more particularly relates to washing or wet cleaning the highly heated combustible gases evolved in blast furnaces, and to the recovery of valuable by-products therefrom in cleaning the gases.

The gases produced when making certain products in blast furnaces contain recoverable quantities of soluble salts. For example, in making ferro-manganese, recoverable amounts of soluble potash salts are contained in the gases. In so far as I am aware, such soluble salts have always been allowed to go to waste with the water used in cleaning the gases.

In washing or wet cleaning blast furnace gases in the washers used heretofore, it is necessary to employ large quantities of water, and this water, after being used, goes to waste, ordinarily being allowed to flow into nearby streams. Large amounts of the removed impurities, in the form of finely divided solids or "flue dust," remain in and are carried away by the waste water, and accumulations of these impurities, which settle out of the water, will clog and gradually fill up the conduits or sewers used in carrying the waste water away from the washers. The "flue dust" also contaminates the streams into which the impurity laden water flows, a condition objected to by the Federal authorities.

Deposition and accumulation of "flue dust" in the drains and sewers will occur even when large settling basins are provided, as is often done, to receive the rejected waste water from the gas washers, while the cost of removing accumulations of such impurities adds to the cost of cleaning the gases.

In washing highly heated gases, such as blast furnace gases, a large amount of water becomes vaporized and is absorbed by the gases and, when allowed to remain in the cleaned gases, this vapor materially lessens the fuel value of the washed gases.

One object of my invention is to provide a multi-stage wet gas washer having novel means whereby highly heated gases such as blast furnace gases are washed and are cooled, so as to remove substantially all of the impurities in the form of finely divided solids from the gases, and whereby the temperature of the gases is reduced at least to the point at which any water absorbed by the heated gases in the form of steam or vapor during the washing operations is condensed and precipitated, moisture is substantially eliminated and a supply of clean and dry gases is obtained.

A further object of my invention is the provision of a gas washer having novel means whereby the soluble salts in the gases and in the impurities in the gases are concentrated and recovered therefrom in condition to be evaporated and thereby reduced to a solid or semi-solid state.

A further object of the invention is to provide a wet washer having novel means whereby the solids removed from the gases are separated from the water used for washing the gases, and the objections to wasting the water into nearby streams is avoided and overcome.

A still further object of this invention is the provision of a wet gas washer having the novel constructions, arrangements, and combination of parts, shown in the drawings, to be described in detail hereinafter and to be particularly pointed out in the appended claims.

Referring now to the drawings, forming part of this specification, Figure 1 is an elevation, partly in section and largely diagrammatic, showing one form of gas washer embodying the novel features of my invention, and Figure 1ª is a continuation of Figure 1. A complete elevation of the apparatus will be had by joining Figures 1 and 1ª on the lines X—X of these figures.

Figure 1:
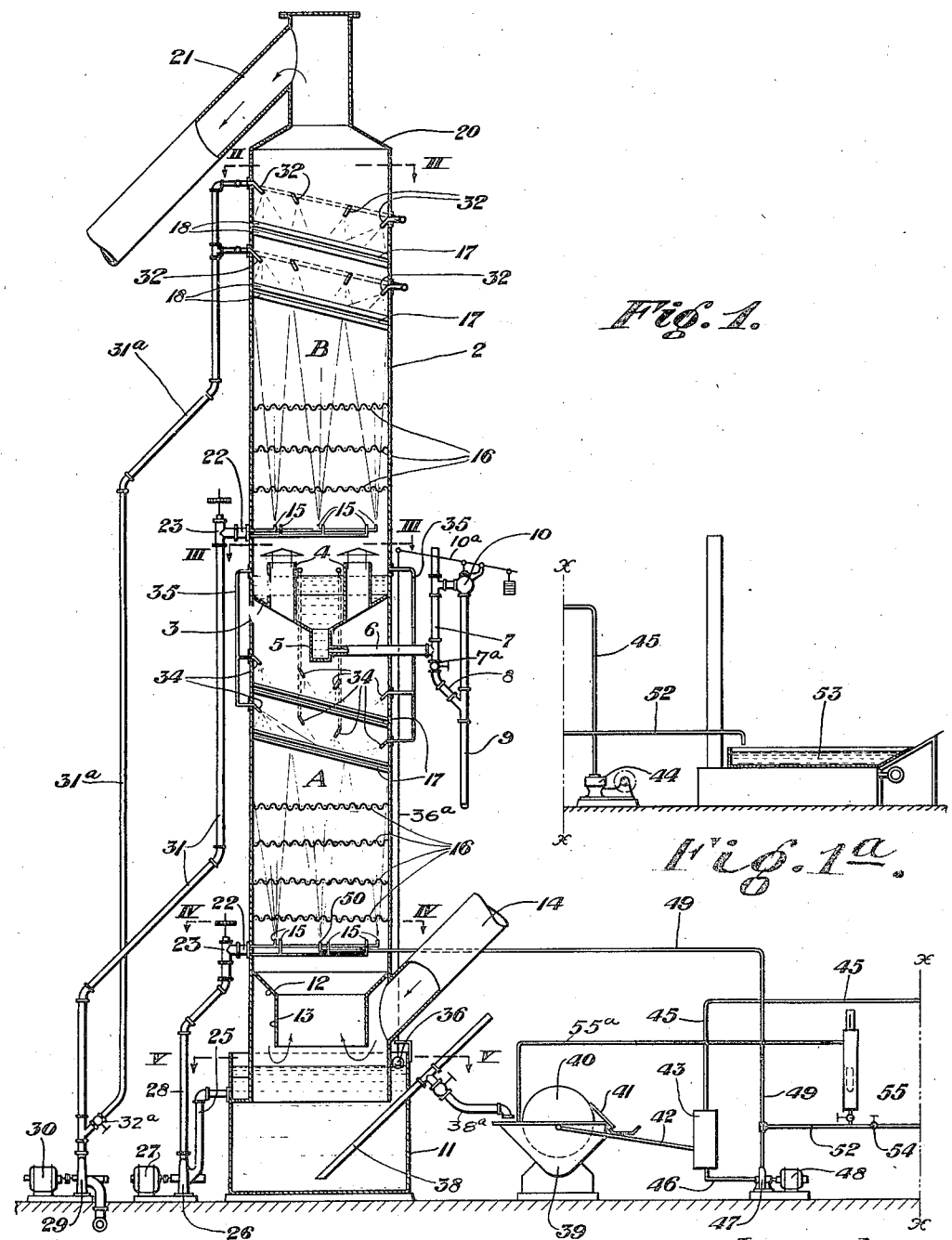
Figure 2:
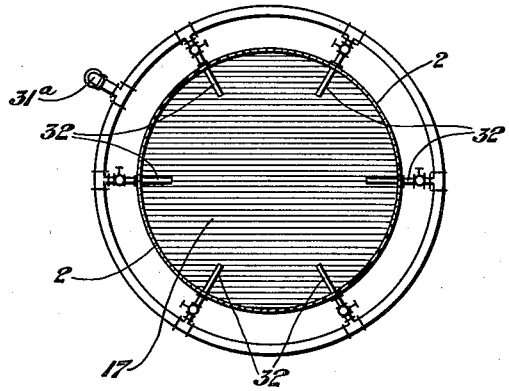
Figure 2 is a sectional plan, the section being taken on the line II—II of Figure 1.
Figure 3:
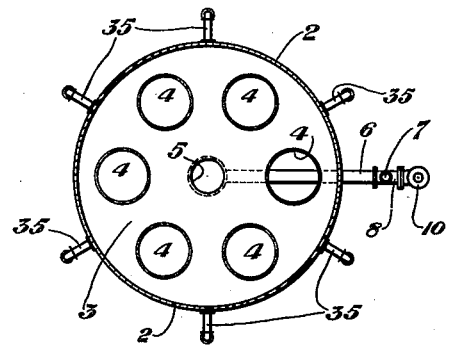
Figure 3 is a sectional plan, taken on the line III—III of Figure 1.
Figure 4:
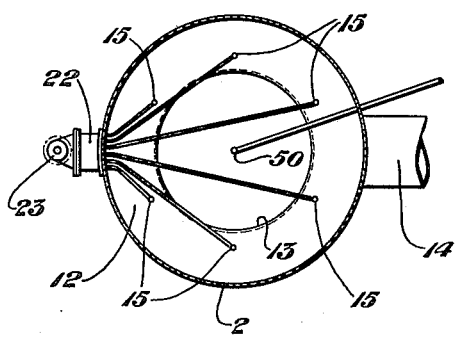
Figure 4 is a sectional plan, taken on the line IV—IV of Figure 1.
Figure 5:
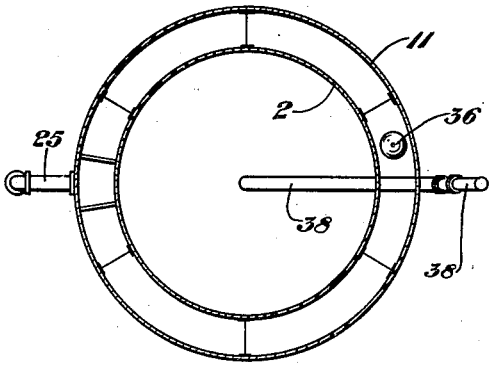
Figure 5 is a sectional plan, the section being taken on the line V—V of Figure 1.

The particular embodiment of my invention shown in the drawings, comprises a lengthwise vertical, cylindrical metal shell 2 which is divided transversely of its length or height, by a conoidal diaphragm or partition 3, into a lower gas washing chamber A and an upper cooling and supplementary gas washing chamber B.

The lower or initial washing chamber A is connected to the cooling and washing chamber B by a series of hooded pipes 4, having open ends and extending upwardly from the conoidal partition 3, and through which the gases pass upwardly from the chamber A into the chamber B in the gas washing operations. The hoods on the upper ends of the pipes 4 serve to prevent water falling through the pipes 4 from the chamber B into the chamber A and also to distribute the ascending gases more uniformly within the chamber B. The lower end of the conoidal partition 3 is provided with a cylindrical extension or well 5, which is connected at its lower end by a drain pipe 6, to a vertical branch pipe 7. This branch pipe 7 is connected at its lower end by a valve controlled branch 8 to the vertical waste water pipe 9, through which the chamber B is drained when necessary. The branch pipe 7 also is connected, adjacent to its open upper end, through a regulating valve 10, to the waste water main 9 to carry off excess water from the lower end of the cooling and secondary cleaning chamber B to a conveniently located sewer or drain (not shown).

The lower end of the metal shell 2 of the washer is supported within a second shell, of greater diameter than the shell 2 and forming a sedimentation or settling basin 11, into which the lower end of the shell 2 opens. (See Figure 1.) A funnel-shaped deflector 12 having an annular lower end 13 of less diameter, is arranged within the shell 2 adjacent to its lower end so as to form an inlet opening or distributor within the cleaning chamber A for the incoming raw or uncleaned gases. A raw gas supply main 14, shown arranged to extend at an angle to the vertical axis of the shell 2, opens at its discharge end into the lower end of the washing chamber A at a level above the lower edge of the annular extension 13 on the gas distributor 12, so that the highly heated, raw or uncleaned gases, in entering the washer from the main 14, will be forced downwardly and caused to impinge on the surface of the water in the basin 11, before passing upwardly through the deflector or distributor 12 into the upper portion of the first stage or initial gas washing chamber A.

Figure 6:
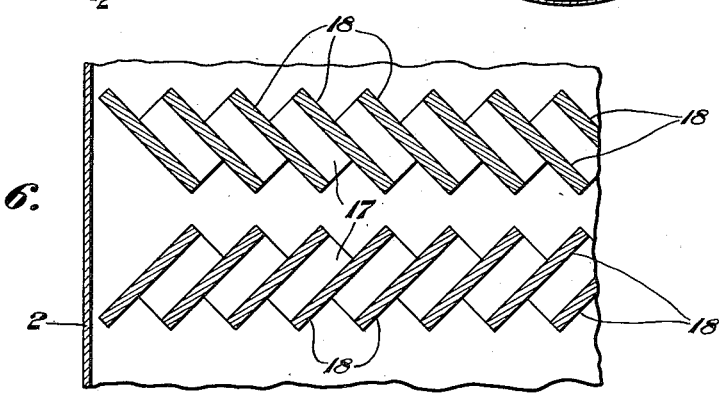
Figure 6 is a sectional elevation, on a larger scale, showing details in the construction of one arrangement of baffles usable in my improved apparatus.

A series of spraying nozzles 15 is mounted within each of the gas cleaning chambers A and B and located above each set of the spraying nozzles is a series of transversely extending screens 16, these screens serving to break up the vertical streams or jets of water issuing upwardly from the nozzles 15. The screens also cause the water in descending to fall within the chambers A and B in the form of rain or mist. A series of baffles 17, which are formed of a plurality of lengthwise inclined, overlapped, spaced sections 18, (see Figure 6) are arranged above each of the two sets of screens 16, near the upper end of the chambers A and B, to collect and remove entrained water from the washed gases. The baffles being inclined, the water collecting thereon will run to the low point of the baffles and down the inner surface of the shell 2.

The upper end of the shell 2 is provided with a dome 20 which opens into the receiving end of the distributing main 21 through which the dry, clean gases are conveyed from the gas washer to a distant place of use.

The series of spraying nozzles 15 in the chamber A is connected by a manifold 22 and a rotary spray controlling valve 23 to a water supply pipe 28, and the spraying nozzles 15 in the chamber B are similarly connected by a manifold 22 and rotating spray controlling valve 23 to a water supply pipe 31. The valves 23, which are positively rotated, are arranged to successively open and close the inlet to each of the series of nozzles 15, so that the water is periodically shut off from each individual nozzle 15. This results in the formation of pockets of gas immediately above each nozzle each time it is momentarily shut off and thereby made inactive, and when such nozzle again operates, the jet of water ejected with some force therefrom is forced upwardly into and through the pocket of gas above it, so as to penetrate and thoroughly wash such pocket of gas. The valves 23 will be provided with a suitable rotating mechanism, (not shown) which may be either of various known constructions.

The nozzles 15 in the lower or first stage washing chamber A are supplied with water from the sedimentation or settling basin 11 in the lower end of the chamber A. A suction pipe 25, having its inlet end connected to the basin 11 above the level at which sediment collects therein, leads to a centrifugal pump 26 and this pump, which is driven by a motor 27, forces the water upwardly through the supply pipe 28 to the rotary valve 23 and upwardly out of the nozzles 15 in the chamber A.

The series of spraying nozzles 15 in the second stage or upper washing and cooling chamber B is supplied with fresh, cool water from a clean water supply main, through the pipe 31, by means of a booster pump 29, which is driven by a motor 30 and which has an outlet connected to the pipe 31 leading to the rotary spray valve 23 controlling the operation of the series of nozzles 15 in the upper cooling and cleaning chamber B.

A second water supply pipe 31ª, which also leads from the outlet of the booster pump 29, is connected to another series of spray nozzles 32 which are located at the upper end of the upper or second stage cleaning and cooling chamber B. The nozzles 32 which point downwardly are arranged to supply water to wash off the baffles 17 in the upper end of the chamber B as is done at intervals. A valve 32ª on the pipe 31ª shuts off the water supply to the nozzles 32.

A similar series of nozzles 34 also is provided in the upper portion of the lower or first stage cleaning chamber A to periodically wash off the baffles therein. Each of the nozzles 34, however is connected by a pipe 35 with the lower end of the upper or second stage cleaning chamber B, at a point slightly above the level of the overflow outlet leading to the stand pipe 7 and float controlled valve 10 on the upper end of the waste water main 9. A valve 7ª is provided in the lower end of the pipe 7, which normally is closed and which is opened when it is found necessary or desirable to drain the well 5 on the lower end of the partition 3.

The water used in spraying the baffles 17 in the upper end of the chamber A is automatically supplied through the series of nozzles 34 and pipes 35 from the quantity of water which collects in the lower end of the upper or secondary chamber B in a manner presently described.

The water within the sedimentation basin 11, being used again and again in the gas washing operations, will gradually become reduced in volume on account of the vaporization and absorption thereof by the heated gases when sprayed with the water, and also on account of the removal from the basin 11, of the sludge formed therein, which largely consists of water.

In order to maintain the water in the basin 11 at a constant level, a float controlled regulating valve 10 is provided on the upper end of the waste water main or drain pipe 11, opening and closing movement of this valve being caused by the float 36, which is mounted in the basin 11. (See Figure 1.) When the water level in the basin 11 falls below a predetermined point, either by reason of vaporization or removal thereof in the sludge, through the pipe 38, or both, the float 36 moves downwardly and when lowered sufficiently will automatically operate the counterweighted lever 10ª so as to close the regulating valve 10. Closing of the valve 10 stops the flow of water from the lower end of the second stage cleaning chamber B into the waste pipe 9, and causes the water to rise to the level of the upper end of the overflow pipes 35 (and in some cases even rise to the upper edge of the series of hooded pipes 4,) so as to overflow through the pipes 35, or pipes 35 and pipes 4, into the chamber A. The water flowing through the series of pipes 35 and spray nozzles 34 cleans and washes off any solid impurities collected on the baffles 17 and falls into the basin 11 so as to restore the water to its usual level therein.

When the water level in the basin 11 is being re-established the float 36 will lift automatically and the counterweight on the valve lever 10ª will open the valve 10 and again permit waste water from the upper chamber B to flow through the stand pipe 7, valve 10 and waste water main 9 to the sewer, as hereinafter described.

Many of the ores used in operating blast furnaces contain valuable soluble salts, potash for example. When the gases evolved in smelting such ores are washed or wet cleaned, the water used will contain considerable amounts of the soluble salt. A concentrated solution of such salts is readily formed from which the salts may be separated and recovered by evaporation. In the operation of my improved washing apparatus the same water is used over and over again in the washing chamber A so that when the gases contain a soluble salt a concentrated solution of such salt is gradually formed which approaches the saturation point. The saturated condition of the concentrated solution materially lessens the amount of evaporation necessary, in separating and recovering the salts.

The concentrated salt solution and sludge which collects in the sedimentation basin 11 must be removed at intervals and, in the particular apparatus shown, this is conveniently done by gravity, the sludge and salt impregnated water flowing through the inclined pipes 38 and 38ª into a continuously operating filtering apparatus 39 in which the solids are removed from the solution. The upper end of the pipe 38 is open to the atmosphere and the branch pipe 38ª has a valve thereon to control the flow of sludge to the filter. The filter 39 has a rotary filtering drum 40, upon which the finely divided solids in the sludge build up in the form of a cake. The caked collections are removed as formed by means of a scraper 41 which engages the periphery of the drum 40. The solution from which the solids are separated in the filter 39 are drawn off by gravity through an inclined discharge pipe 42 having its discharge end connected to a solution receiving tank 43. This tank 43 has a vacuum pump 44 connected therewith by a pipe 45, so as to reduce the pressure within the tank to a minimum.

A pipe 46 connected at its inlet end to the lower end of the vacuum tank 43 has its discharge end connected to the inlet side of the rotary pump 47, which is operated by a driving motor 48. The pump outlet is connected to a return pipe 49 which leads into the lower or first stage washing chamber A and terminates in a spray nozzle 50. By this arrangement of piping the water or salt solution which is separated from the sludge in the filter 39 is returned to the basin 11 of the washer, this recirculation of the solution being continued until the desired degree of saturation is obtained in the basin 11.

The return pipe 49 also is provided with a branch 52 which leads to an evaporating vat or pan 53 and, preferably, this branch pipe 52 will be provided with a hydrometer 55 and circulation pipe 55ª, arranged to circulate a small amount of the solution at all times through the hydrometer and the pipe 55ª. In this way the specific gravity of the solution or brine is readily learned at all times.

When the brine separated from the sludge is concentrated to a predetermined amount, the valve 54 on the branch pipe 52 will be opened to allow the concentrated solution to flow into the evaporating pan 53.

When found desirable or necessary, an automatically operated valve mechanism may be used so as to mechanically open the valve 54 and permit the flow of brine or solution into the evaporating pan 53 when the specific gravity desired is attained. The brine in the pan 53 is then evaporated and the resulting salt crystals are removed to a place of storage for further refining treatment or the salts may be packaged and shipped.

The operation of washing gases with my improved apparatus will now be described. The pump 29 will be started so as to fill the well 5 at the lower end of the chamber B. Sufficient water also will be supplied by the pump 29 to fill the basin 11 with water, the excess water from the chamber B flowing through the spraying nozzles 34 into the chamber A and basin 11. The rough dirty gases are then turned on, being supplied through the gas main 14 to the lower end of the metal washing chamber A. The incoming stream of gases impinges on the surface of the water in the basin 11, the deflector 13 serving to change the direction of flow of the gases. The rising column of gases, which flows upwardly through the chamber A is then subjected to the washing action of the water sprayed into the chamber A by its nozzles 15, this water being supplied by the pump 26 and being obtained through the pipe 25 from the overflow outlet of the basin 11. The water issuing from the nozzle 15 is sprayed upwardly through the screens 16 and being broken by the screens is intimately mixed with the gases. The water when descending within the chamber A is broken up into a rain by the screens 16 and again acts to remove solid impurities from and further clean the gases. Any entrained water in the gases is collected by the inclined baffles 17 and thereby removed from the gases.

The gases entering the chamber B, being highly heated, absorb a considerable amount of water in the form of steam or vapor and the vapor laden gases pass upwardly through the hooded pipes 4 from the chamber A into the chamber B. The vapor laden gases, in passing upwardly through the chamber B are again sprayed with water that is supplied through the nozzles 15 of the chamber B. In this instance the water is the fresh cool water pumped into the chamber B by the pumps 29. The gases, in passing through the chamber B, are brought into intimate contact with the water sprayed into the chamber B by its nozzles 15 and with the rain of water which falls downwardly within this chamber, and in this way any remaining impurities in the gases are washed out. At the same time the gases are cooled to the point at which the water vapor therein is condensed and separated from the gases. Any entrained water in the gases in the upper chamber B is caught by the baffles 17, and the cooled and now clean, dry gases pass outwardly from the upper end of the chamber B into the clean gas main 21. The cleaned gases are conducted by the main 21 to the place or places of use.

It should be particularly noted that the water in the basin 11 is used over and over in washing the gases in the chamber A. That is to say, the volume may be as great as required without increasing the amount of water.

The water in the chamber A will gradually reduce in volume by reason of absorption by the highly heated gases and on account of the water removed as part of the sludge formed in the basin 11. The desired quantity is automatically maintained in the basin 11 by additions of water from the secondary chamber B. It will be seen that as the level of the water in the chamber A lowers, the float 36 in the basin 11 also will be lowered. Downward movement of the float causes the valve 10 on the upper end of the overflow pipe 9 to close so that the water level rises in the lower end of the chamber B and overflows through the pipes 35 and nozzles 34 into the upper end of the chamber A. The water discharged through the nozzles 34 will wash off the inclined baffles 17 in the upper end of the chamber A and at the same time this additional water also restores the level of the water in the basin 11 to the required level.

When a rise in the level of the water in the basin 11 lifts the float 36 sufficiently, the counterweight on the operating lever 10$^a$ again opens the valve 10 and prevents the further flow of water from the chamber B into the chamber A, any excess water passing out of the chamber B into the waste pipe 9.

The sludge formed in the basin 11, which consists of a mixture of the finely divided solids washed from the gases and water will flow from the basin through the pipe 38 into the filter 39. The filter drum 40, of the vacuum filter shown, will accumulate a film of the solid impurities as it revolves in the sludge within the filter, this film being scraped off by the scraper 41 as fast as formed, and in this way the solid impurities are separated from the water or solution in the filtering apparatus 39. In some cases, as when the sludge does not contain any soluble salts, the separated water is allowed to go to waste.

When making ferromanganese or when smelting various other kinds of ores, the uncleaned gases or the impurities in these gases will contain potash or other soluble salts. When such gases are washed in my improved gas washer, the impurities in the shape of finely divided solids are removed and a concentrated solution of the soluble salts will be gradually formed in the basin 11, the salts being leached out of the solid impurities. In such case the separated water from the filtering apparatus 39 will be discharged into the vacuum tank 43 and from the tank 43 to the pump 47. The pump 47 will discharge the solution through the nozzle 50 into the chamber A, so that in this way the salt solution from the filter 39 will be added to the concentrated solution in the basin 11 until the desired density or specific gravity has been attained. When this occurs the valve 54 will be opened and the pump 47 will then discharge the saturated salt solution from the filtering apparatus into the evaporating vat or pan 53 through the pipe 52. The solution in the pan 53 is then evaporated so as to recover the potash or other salt in a crystallized condition.

The advantages of my invention will be apparent to those skilled in the art.

In using my improved gas washer solely in washing gases the amount of water necessary in rough washing is lessened to a large extent by reason of the reuse of the same water for extended time intervals in the chamber A and using fresh, clean water in the chamber B. After rough washing the gases in the chamber A, the fresh, clean water from the chamber B will again and further clean the gases and also will cool them to a point at which the water vapor is condensed and separated out of the gases and the cleaned gases will pass from the washing apparatus into the clean gas main 21 in a clean, and relatively dry state. The water rejected from the chamber B will be substantially clean and can be allowed to go to waste without objection.

When the gases being washed contain soluble salts, the salts are automatically concentrated and formed into a saturated solution and are afterwards separated from the water and evaporated and recovered, in the form of salt crystals.

Many changes in the construction and arrangement of the parts of my improved apparatus may be made without departing from my invention as defined in the appended claims. The apparatus may be used simply in washing gases or may be used to wash the gases as well as recover the soluble salts as a by-product.

I claim:

1. A gas washer comprising first and second stage washing chambers through which the gases are successively passed in the gas washing operations, means for supplying thereto the water used in washing the gases, means for recirculating through said first stage washing chamber the water used therein in the gas washing operations, means for supplying from said second stage washer the water used in maintaining the supply of water in said first stage washing chamber, means for recovering excess water from said second stage chamber and means regulated by the quantity of water in said first stage washing chamber for controlling the flow of water from said second stage chamber.

2. A gas washer comprising first and second stage washing chambers through which gases are successively passed in the gas washing operations, means for supplying water thereto for washing the gases, means for removing entrained water from the gases, means for removing sludge from the first stage washing chamber, means for supplying water from said second stage washer in maintaining the supply of water in said first stage washing chamber, means for removing excess water from said second stage chamber and means regulated by the quantity of water in said first stage washing chamber for controlling the flow of water from said second stage chamber.

3. A gas washer comprising first and second stage washing chambers through which the gases are successively passed in the gas washing operations, means for supplying the water used in washing the gases to said second stage washing chamber and automatic means controlled by the water in said first stage chamber for maintaining the water supply in said first stage chamber and for removing surplus water from said second stage chamber.

4. A gas washer comprising first and second stage washing chambers through which gases are successively passed in the gas washing operations, means for supplying to said washing chambers the water used in washing the gases, means for removing accumulations of sludge from the first stage washing chamber, means for supplying water from said second stage washer in maintaining the supply of water in said first stage washing chamber, means for removing excess water from said second stage chamber, and means operable by the water in said first stage chamber for controlling the flow of water from said second stage chamber.

5. A gas washer comprising first and second stage washing chambers through which gases are successively passed in the gas washing operations, means for supplying the water used in washing the gases to said second stage washing chamber, means for supplying the water used in said first stage washing chamber from said second stage chamber, means controlled by the water in said first stage chamber for controlling the flow of water from said second stage chamber to said first stage chamber, and means for removing surplus water from said second stage chamber.

6. A gas washer comprising first and second stage washing chambers through which the gases are successively passed in the gas washing operations, means for supplying a constant supply of fresh water to said second stage washing chamber, conduits leading from said second stage chamber to said first stage chamber to permit a flow of water from said second stage chamber into said first stage chamber, a waste conduit leading from said second stage chamber and means operable by the water in said first stage chamber for controlling the flow of water from said second stage chamber.

7. A gas washer comprising first and second stage washing chambers through which the gases are successively passed in the gas washing operations, means for supplying a constant supply of fresh water to said second stage washing chamber, conduits leading from said second stage chamber to said first stage chamber into said first stage chamber, a waste conduit leading from said second stage chamber, means operable by the water in said first stage chamber for controlling the flow of water from said second stage chamber, and means for recirculating the water used in said first stage chamber to concentrate salt solutions formed therein.

8. A gas washer comprising first and second stage washing chambers through which the gases are successively passed in the gas washing operations, means for supplying a constant supply of fresh water to said second stage washing chamber, conduits leading from said second stage chamber to said first stage chamber into said first stage chamber, a waste conduit leading from said second stage chamber, means operable by the water in said first stage chamber for controlling the flow of water from said second stage chamber, means for recirculating the water used in said first stage chamber to concentrate salt solutions formed therein, and means for removing sludge from said first stage washing chamber.

9. In the washing of heated gases the steps consisting of subjecting the gases to an initial washing operation to remove the major portion of the salts and other impurities therefrom, circulating the water used in said initial washing operation through successive quantities of uncleaned gases until it becomes charged with the impurities and salts carried by said gases forming a concentrated solution, subjecting the gases to a second and final washing operation in which fresh cool water alone is used, so that all remaining impurities are removed and all vapor absorbed by the gases in the initial washing operation is condensed from the gases and the gases cooled, removing a portion of the sludge and concentrated solution from the water used in the initial washing operation and maintaining a constant supply of water for the initial washing operation by replacing the removed liquid with water that has been used in the second washing operation.

In witness whereof, I have hereunto signed my name.

BRUCE WALTER.